United States Patent
Ukelson

(10) Patent No.: US 6,338,096 B1
(45) Date of Patent: Jan. 8, 2002

(54) SYSTEM USES KERNALS OF MICRO WEB SERVER FOR SUPPORTING HTML WEB BROWSER IN PROVIDING HTML DATA FORMAT AND HTTP PROTOCOL FROM VARIETY OF DATA SOURCES

(75) Inventor: Jacob Paul Ukelson, Hartsdale, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/095,252

(22) Filed: Jun. 10, 1998

(51) Int. Cl.$^7$ ................................................. G06F 9/00
(52) U.S. Cl. ....................... 709/319; 709/310; 709/246; 709/247
(58) Field of Search ................................ 709/229, 201, 709/202, 208, 217, 319, 310, 246, 247; 707/1

(56) References Cited

U.S. PATENT DOCUMENTS 5,895,461 A * 4/1999 De La Huerga et al. ........ 707/1

FOREIGN PATENT DOCUMENTS

| EP | 921481 A2 | 6/1999 |
| WO | WO 97/18635 | 5/1997 |

OTHER PUBLICATIONS

M2 Communications Newsletter, "Field–to–web gateway provides powerful, economic SCADA tool for 21st century", Nov. 1996.*
Electronic Engineering Times, Costlow "Web Servers—Spyglass updates software", p.65, Aug. 1997.*
Electronic Engineering Times, Eubanks, "Micro–Web servers monitor remote data", p.122, Nov. 1997.*
Business Wire, "Web Solution Package", Feb. 1998.*
Cisco Systems, Inc., "Chapter 4, Using Micro Webserver", p.4–1, 89–97.*
Phar Lap Software, Inc. "Internet Weather Station Software", Technical Document, May 1997.*
Acta Polytechnica Scandinavica Chemical Technology, Series No. 223, 1995, pp. 1–54.
Makromal Chemical 192, 1115–1127 (1191).
Makromal Chemical 193, 229–241 (1992).#jf139##

*Primary Examiner*—Le Hien Luu
(74) *Attorney, Agent, or Firm*—Scully, Scott, Murphy & Presser; Daniel P. Morris, Esc

(57) ABSTRACT

The present invention provides a method and apparatus for transparently accessing multiple local and remote data stream types from an HTML browser. A micro web browser is disclosed which runs on the same platform as any commercial HTML browser, but in a separate process. Capabilities of the micro web browser include processing a data stream before the stream reaches the browser, translating different protocols to HTTP and different data types to HTML, where the translation is performed either on the fly or as pages are stored on the disk. The micro web server is further capable of allowing mixed media searches (e.g. searching first a users hard drive, then a users CD, then the World Wide Web. Additional capabilities of the micro web server include password protection, automated background download, intelligent prefetch of links, smart background printing, security mechanisms including page lockout and monitoring, decompression of media including CD ROMs and DVD, data stream modification including the addition of advertisements into streams and consistent buttons to all HTML pages.

42 Claims, 7 Drawing Sheets

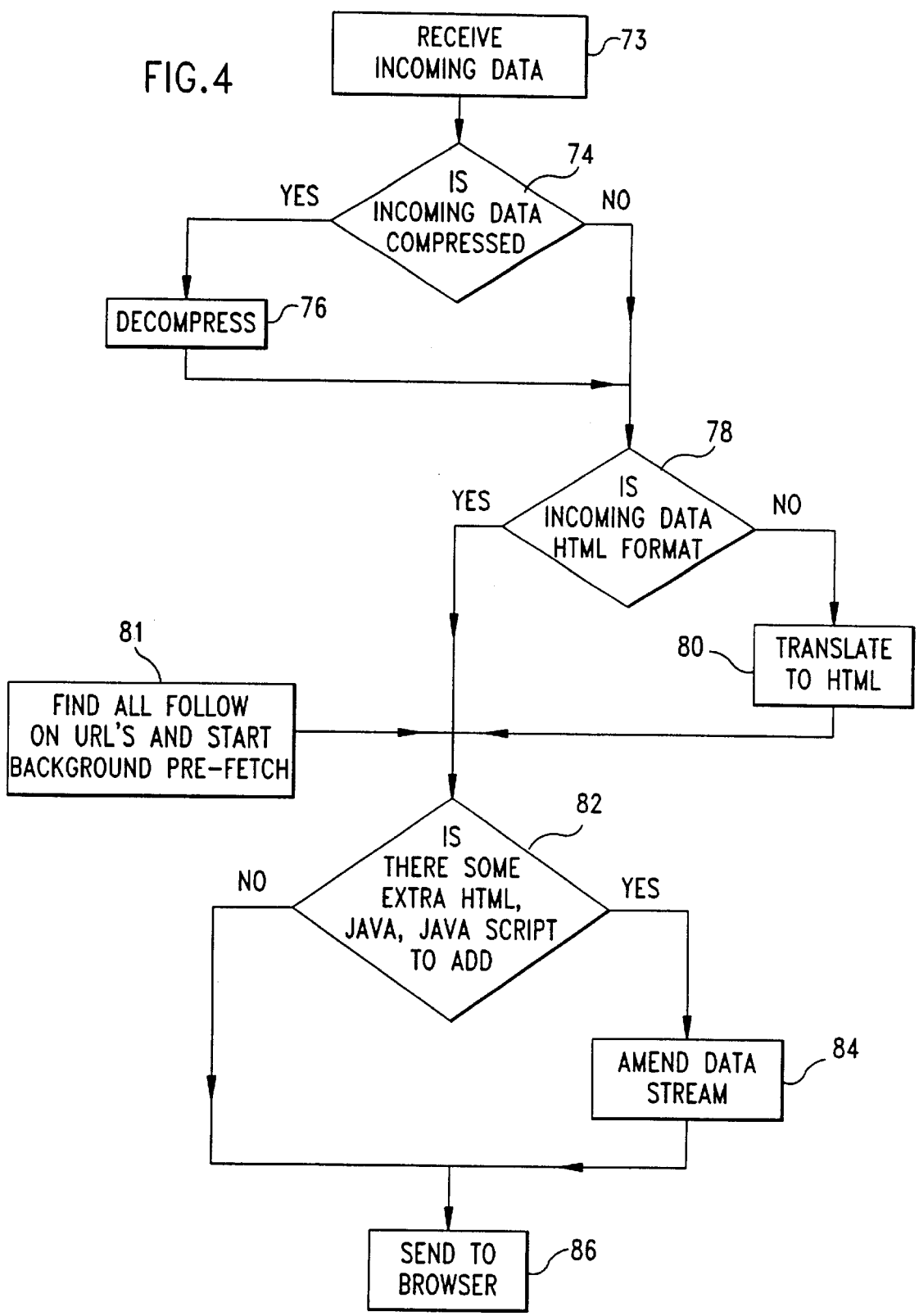

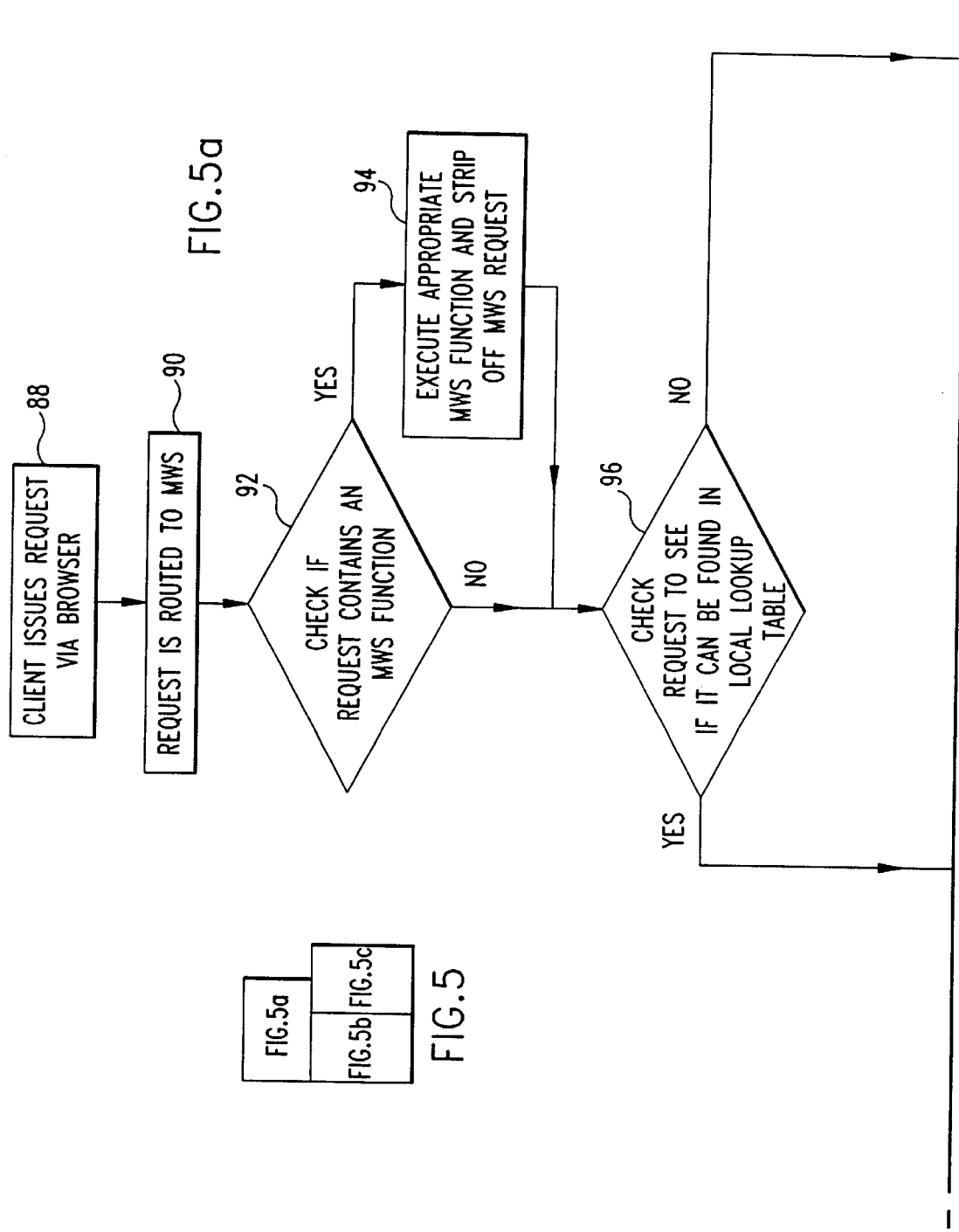

SYSTEM USES KERNALS OF MICRO WEB SERVER FOR SUPPORTING HTML WEB BROWSER IN PROVIDING HTML DATA FORMAT AND HTTP PROTOCOL FROM VARIETY OF DATA SOURCES

BACKGROUND OF THE INVENTION

1. Field of the Invention

The present invention relates generally to computer networks and, more particularly to a method for enhancing the operation of a client browser.

2. Description of the Related Art

The Internet, and more particularly the World Wide Web, continues to receive tremendous publicity. It is a collection of interconnected computer networks that covers the entire globe. The network of computers which collectively comprise this phenomenon has grown at a staggering rate, almost doubling in size every ten months for the past six years. The data available has grown as fast as the Internet itself and measures in the terabytes.

The World Wide Web is that part of the Internet which represents all the computers (servers) that offer users access to hypermedia-based information and documentation. Hypermedia enables users to navigate the Internet, moving with point-and-click ease from one location or one document to another. Browsers provide a graphical interface to the Web with menu options, icons and images you click on, buttons, graphics, and links that you use to access files of information from the Web. These files are known as "documents." A Web document can be just one page, or it can be several pages. Even if the document is just one page, you usually find links to other documents, and from those documents are links to yet others. The first document you access usually has an entry "point," or home page, so named because it usually contains the creator's name, a company name if its a business, and pointers to the document contents.

The World Wide Web uses several protocols to transport and display the multimedia resources that reside on computers (servers) around the world. One of them is the HTTP (HyperText Transport Protocol). HTTP works with Web servers to provide a client-server environment for the Internet. HTTP supports the ability of the Internet to provide access to an enormous quantity of interlinked resources.

The basic model of the Internet is straightforward, it can be thought of as a global client/server application. A client program (Web browser) needs to know the address of the resource (document) the user wants and it needs a way to communicate with the server. The address is known as the Uniform Resource Locator (URL) and the means of communication is through a protocol such as HTTP. The URL is actually present in the document being displayed. When a user clicks on a hypertext link, the browser gets the URL from the document. Given the protocol and address, the browser transmits a request to open a connection to the server. Once the connection is made, the browser sends a request for the document. The server sends the document, if it exists, and disconnects from its end of the connection. As previously stated the first information that you get from a remote Web server is known as a home page. The home page is an initial interface to a series of other documents, files, and resources that reside on that computer or on other Web servers around the world.

The document which is returned by the server is formatted with HTML (Hypertext Markup Language) commands. HTML is a computer programming language used to create, format, and identify titles, subheadings, bold, italics, and hyperlinks that enable you to jump between places within a document, on the same computer (server), or to another remote server located somewhere on the Internet. HTML is comprised of a standard set of codes or "tags" that are inserted into a document and leaves the interpretation of these marked elements up to the browser displaying the document. World Wide Web pages are written and composed in the HTML page description language. Despite the fact that different browsers understand more or less sophisticated versions of the HTML language, the de facto standard for Web browsers is that they interpret HTML documents at the very least. Unfortunately, not every Web browser works in the same way. Some browsers support graphics, other do not. Some browsers have extensive formatting support features while other have just a few. Some do not support the more advanced features.

HTML compliant Web browsers parse the stream of commands and use tools from their native operating environment to build display images representing the material in the command stream. Furthermore, HTML compliant Web Browsers typically expect a webpage, formatted in HTML, to come either from one of the many servers on the Internet network, or from a file. In either situation, the HTML stream must define where the page is coming from. If the webpage can come from a variety of media (CD-ROM,DVD) a regular browser and standard HTML could not handle that.

Another shortcoming of present browser technology concerns the finite time period between the time a user initiates a link and the return of the webpage. We live in a world where speed and convenience has become the norm. As the economies of nations around the world become increasingly interdependent, speed of information delivery becomes a valuable competitive tool. While the Internet has no peer with regard to moving massive amounts of information rapidly, most users of the Internet still experience varying degrees of frustration over the delays inherent in the time required to transfer documents across the network. The amount of time it takes to transfer an image across a network depends on a number of factors, amongst them are the transfer rate, the quantity of data, network traffic and the throughput speed of storage devices. Since networks are usually comprised of many sub-networks, it is extremely difficult to estimate actual data transfer rates. It may be that the backbone of the network is fiber optic, but if the link from the backbone to the host or client computer is something slower like ethernet or much worse a modem, rates will suffer.

The second most influential factor affecting data transfer rates is the quantity of data transferred. The more data you have, the longer it takes to transfer it across a network. Digital images, for example, are extremely data intensive. Some Web documents have so many inline images, or a very few large ones, that they can take several minutes to load on a slow (modem) connection. While data reduction techniques may be employed to lessen the impact the tradeoff is image quality.

A third variable, over which the user has no control concerns network traffic. The combination of the above factors create a situation which impedes the exchange of information between clients and servers on the World Wide Web and frustrates end users as a result.

Another shortcoming associated with existing browser technology concerns the limited recognition of the ever growing list of protocols with which multimedia resources are transported and displayed over the internet. The World Wide Web is generally considered to consist primarily of the following three services, HTTP, Gopher, and FTP. Popular Browsers, like Netscape Navigator utilize the HTTP protocol to access hypertext documents from Web servers. HTTP is the service that enables Web clients to receive hypertext content that can link to other hypertext content—and to nonhypertext content as well. In and of itself, HTTP is just an Internet protocol like so many other protocols. It's popularity stems mainly from its early use. There exists today a number of more efficient protocols not currently supported by the current generation of browsers. It would be desirable for a regular browser to be able to access resources that utilize new or existing protocols other than HTTP.

A further shortcoming associated with the internet is that of security. Security, and its many implications, has become and remains a real concern since the very inception of the Internet. Parents are concerned that their children run the risk of gaining easy access, or being inadvertently exposed to, ever increasing amounts of adult oriented information not intended for minors. Employers concern run to their employees who must be constrained from utilizing the internet for purposes other than to satisfy their employers needs. Given the widespread corporate acceptance of the Internet, unproductive use of the resource at the corporate level could translate into billions of dollars of lost revenue.

In addition to the concerns of multiple protocols, security, transfer speed, and non-HTML datastreams, a further concern relates to the issue of file compression. While compressing and decompressing files are a necessary consequence of today's file sizes and transmission rates. It would be desirable for a user to not have to be concerned with the vagaries of the different compression formats and versions in existence today.

A need therefore exists for a method and apparatus which addresses the various shortcomings associated with current browser technology.

SUMMARY OF THE INVENTION

Therefore, it is an object of the invention to enhance the operation of a web browser by providing a means for recognizing URL requests from diverse media sources including a hard disk cache, and read only media including CD-Rom and DVD from a network.

It is another object of the present invention to enhance the operation of a web browser by providing a means for modifying an incoming data stream (e.g. to allow advertisements into a stream, or add a set of consistent "buttons" to all HTML pages, or add JAVA applications including smart printing, site viewers, and smart site searching).

It is a further object of the present invention to enhance the operation of a web browser by providing a capability for decrypting downloaded information in encrypted format to allow access to compressed media content like CD Roms and DVD.

It is a still further object of the present invention to enhance the operation of a web browser by providing a security mechanism which would allow a user access to only specific media or portions of media.

It is yet still a further object of the present invention to enhance the operation of a web browser whereby a micro web server would be able to access information utilizing protocols other than the Hypertext Transfer Protocol (HTTP).

It is a still further object of the present invention to enhance the operation of a web browser by providing a means for enhancing a users perception of download speed associated with user requested HTML pages.

Accordingly, these and other objects of the present invention are achieved by a Micro Web Server (hereinafter MWS) that runs on the same machine as the browser, but in a separate process. This allows for local processing to occur before the HTML data stream reaches the browser, thereby allowing for manipulation of that string, while still using standard off the shelf browser technology. The MWS effectively sits between the browser and the data that the browser requests. From the browser's perspective all data is coming from a web server when in fact the data may be coming from a set of diverse sources. The MWS also allows for "intelligent" brokering between a browser and a datastream.

The MWS also allows for translation of different protocols to HTTP and the different data types to HTML, which would allow access and display of documents that couldn't normally be displayed using a standard HTML browser (e.g. IBM 3270 screen format and protocol).

This mechanism would also allow for a hybrid remote-local media paradigm, where a backend (e.g. a DB2 database) can reside wholly on local media, or be split between local and remote media. Furthermore, this mechanism could allow for translation of URL's before they are actually fetched from the Web.

The MWS mechanism can further enhance the perception of page download time by intelligently pre-fetching links. That is, whenever a page is fetched by the MWS, any reference to a URL is noted. After the page is sent to the browser for display, the MWS goes through the list of possible links and starts pre-fetching those links and caching them on the local drive.

The MWS can also be used to enhance the printing of a Web document. If a user requests that a whole document be printed, the MWS can use a similar analysis as in the "Intelligent pre-fetch of Links" to fetch the whole document and print it in the background.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following detailed description of the preferred embodiment.

BRIEF DESCRIPTION OF THE DRAWINGS

For a more complete understanding of the present invention and the advantages thereof, reference should be made to the following Detailed Description taken in connection with the accompanying drawings in which;

FIG 2.b is a schematic diagram of a communication model which describes the Internet incorporating the apparatus of the present invention, (e.g. the micro web server).

FIG. 4. is a flowchart diagram of a preferred method of the present invention for information incoming to a user, via a micro-web server, from one of a multiplicity of sources.

DETAILED DESCRIPTION

The invention is preferably implemented in a computer as a computer program stored on a computer readable format where the computer program consists of program statements executable by the computer. The computer preferably consists of a processor, an operating system, multiple local storage devices, a graphical user interface, a means for remote connection to the Internet, and an HTTP-compliant browser.

Figure 1:
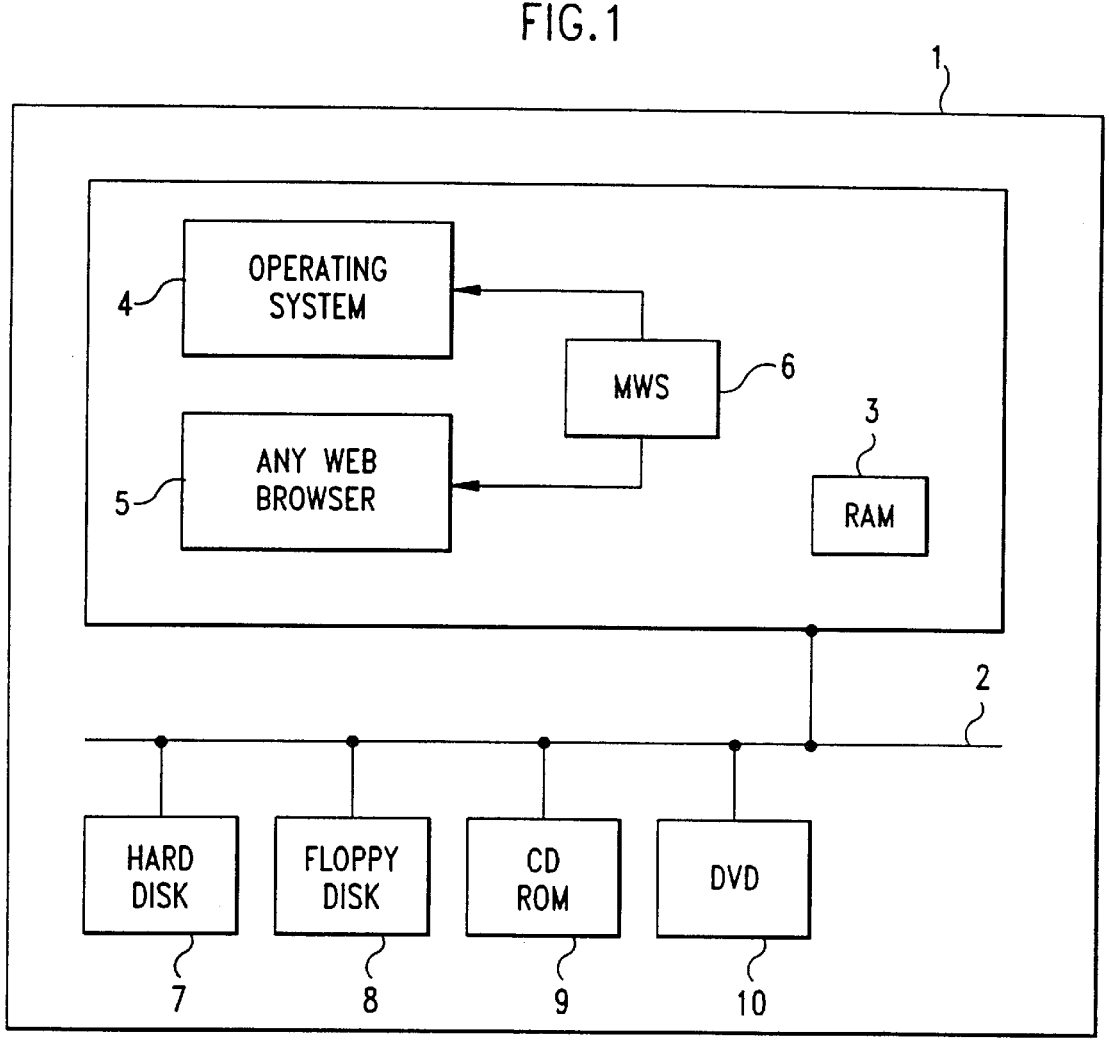
FIG. 1. illustrates a representative client computer supporting an HTML compliant Worldwide Web browser.

FIG. 1 is a block diagram illustrating a representative "client" computer 1 in which the present invention is implemented. The system unit 1 includes a system bus 2 to which various components are coupled and by which intercommunication between the devices occurs. The RAM 3 is the main memory into which both the operating system 4 and application programs such as the browser 5 and Micro Web Server 6 are loaded. The RAM may also serve the additional function of storing (caching) downloaded information from the Internet as requested by the user. Also shown in FIG. 1 is the hard disk drive 7, floppy disk 8, CD-ROM 9, and DVD 10 as representative of typical local storage mediums.

The operating system 4 of the "client" computer may be any known or available operating system. The browser in a preferred embodiment is considered to be HTML and HTTP compliant. Known browser software includes Netscape, Netscape Navigator 2.0 and 3.0, Internet Explorer, and Mosaic to name some of the more popular browsers currently in use. The present invention is designed to operate in concert with any of these known or developing web browsers.

According to the present invention, a micro web server 6, runs on the client computer 1 along with the browser 5 but in a separate process. This allows for local processing of the incoming data stream to occur before the HTML data stream reaches the browser 5, thereby allowing for manipulation of that string, while still using standard off the shelf browser technology.

In a preferred operation of the present invention, a user would be given the option of selecting whether or not the features of the present invention were to be utilized in conjunction with the standard browser, in essence, whether the present invention was to be "switched on". In the situation where the user chose to utilize the present invention, certain options would be presented with regard to password protection checking. The first operation the MWS performs when trying to fetch a page is to check if the user is allowed to access the page. A user can be given a password protected list of pages and sites that are allowed to be viewed or lists of pages and sites that are not allowed to be viewed. This could also encompass a list given to the user after a fee is paid, so that certain sites have a viewing payment associated with them. When a page is fetched it is checked against the list. If the page is not viewable a page describing the problem is sent to the browser.

The MWS could also keep a list of all the pages requested for later review and monitoring.

Figure 2A:
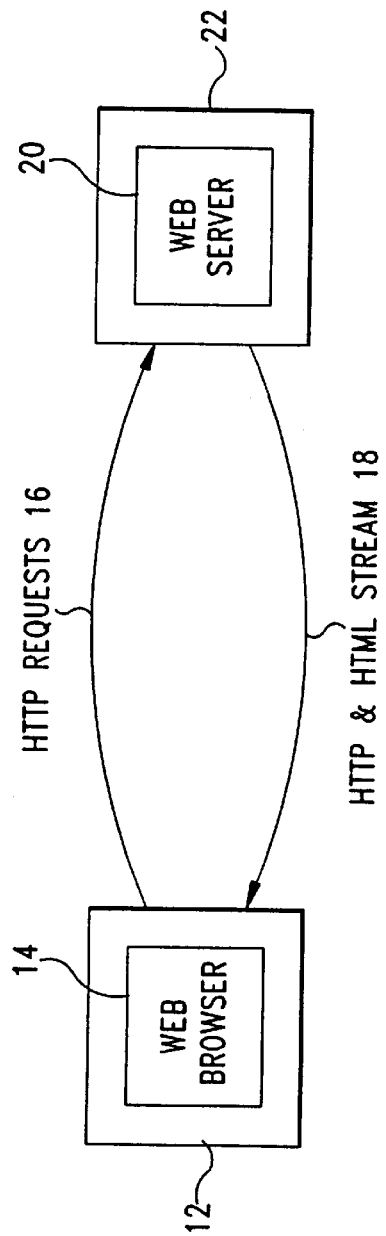
FIG 2.a is a schematic prior art diagram of a communication model which describes the Internet.

FIG. 2*a* is a prior art illustration of the communication model which best describes the Internet, that of a client/server architecture where a network of browsers and servers work together for the purpose of transmitting and receiving information. FIG. 2*a* illustrates a typical client/server pair where a browser 14 running as a client program on a client computer 12, requests information, via the HTTP protocol 16, from a server program 20 running on another computer 22 somewhere on the Internet. That server sends the requested data back over the Net, via an HTML style document utilizing the HTTP protocol 18, to the Web browser, which interprets and displays the data on the client's screen. From the client's perspective browsing the Web entails two basic hardware requirements: it must have a connection to the Internet and must be capable of running a Web browser program.

Figure 2B:
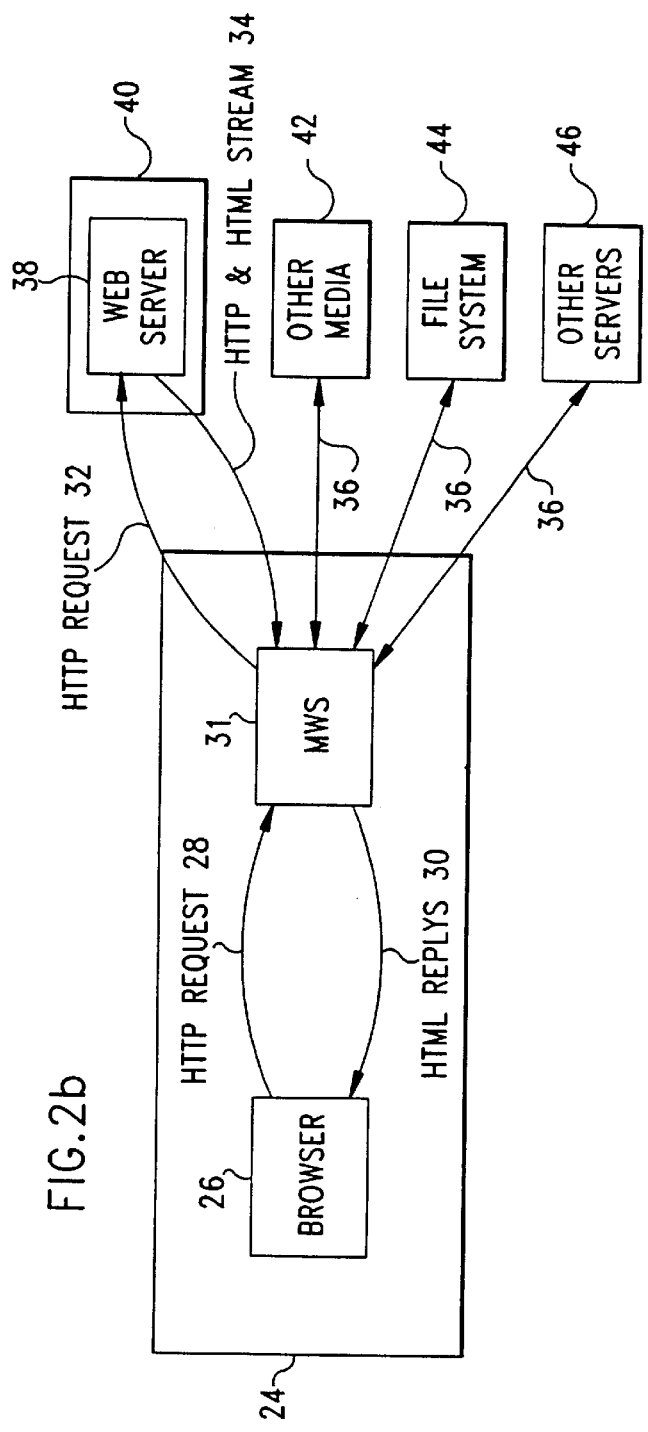

FIG. 2*b* is an illustration of a communication model of the Internet incorporating the apparatus of the present invention. The client/server architecture depicted in FIG. 2*b* is similar to that described in FIG. 2*a*, however, FIG. 2*b* illustrates the inclusion of a micro web server, MWS, 31 running as a client program on the same client computer 12, but in a separate process, along with the standard browser 14. Browser initiated requests 16 are first intercepted by the MWS 31 for any required pre-processing prior to the request's issuance to a diversity or destinations including a remote web server 38 running on a remote computer 40, other media 42 (including CD-Rom, DVD), a file system 44 internal to the client computer 24 initiating the request, or other servers in the network 46. As a corollary to the HTTP requests which originate from the browser 26, HTML replays to be received by the Browser 26 are first routed from one of the diversity of sources described in FIG. 2*b* as an HTML or non HTML data stream, depending upon the source to the MWS 31 for any required pre-processing prior to the MWS passing the data stream as an HTML reply 30 to the standard Browser 26.

Figure 3:
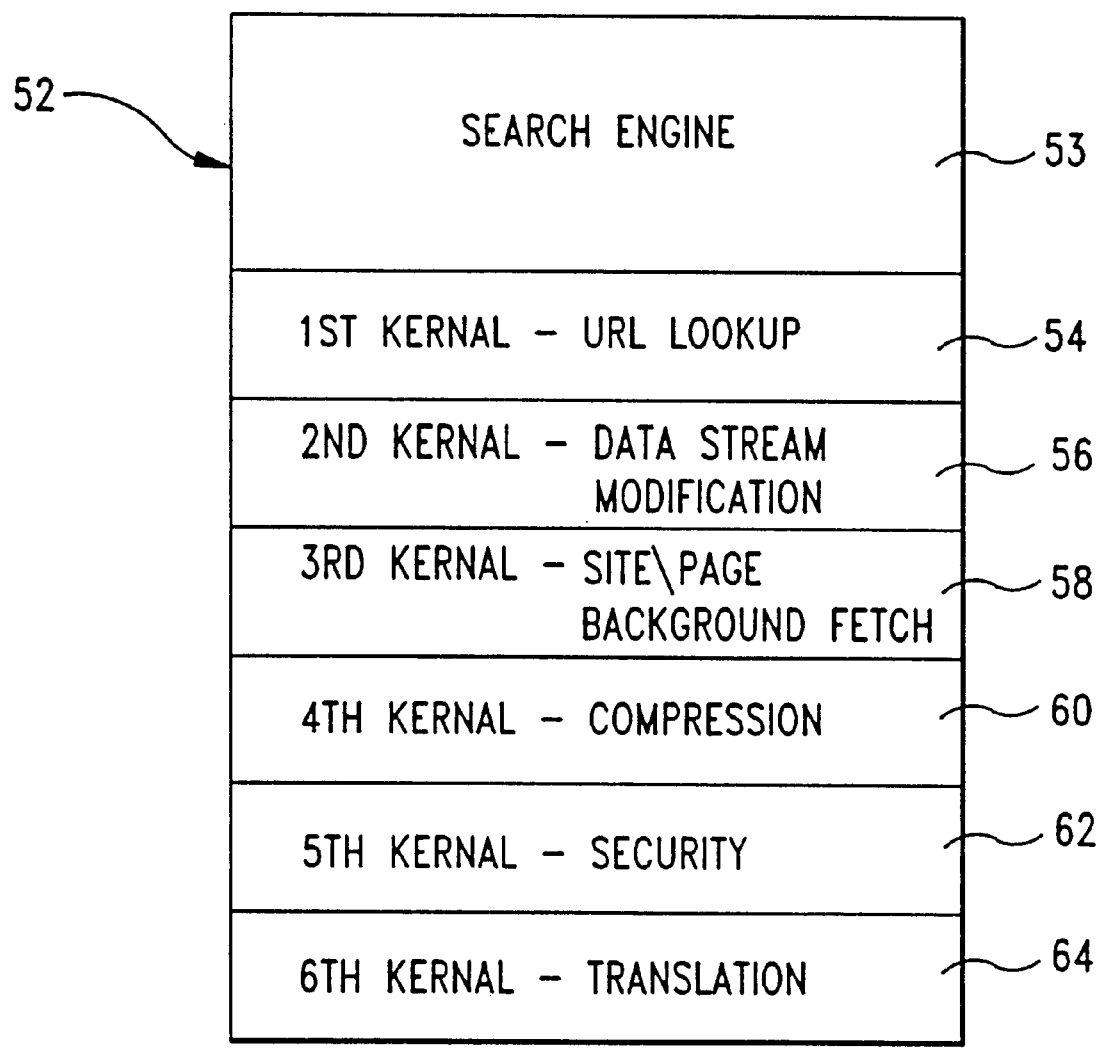
FIG. 3. illustrates the functional enhancements provided by the micro web server, where each functional enhancement is represented by a dedicated kernal.

FIG. 3 illustrates the functional enhancements provided by the incorporation of the MWS 52 as an intermediate process between the standard browser 26 (FIG. 2.*b*) and the various external and internal media (e.g. 7, 8, 9 and 10 described at FIG. 1). Whenever a standard browser requests a new page one or more functions may be performed by various kernels contained within the MWS 52 to facilitate the request. Those functions (kernels) include 1) Kernal 1—URL lookup 54—The MWS would accept URL requests from the browser and would in turn decide what media the source is coming from (e.g. harddisk cache HD, read only media, such as CD-Rom or DVD, or from the network, thereby allowing a mixed media search (e.g. first HD, then CD or DVD, then the Web). Once the source has been determined the appropriate page will be transmitted via the MWS to the Browser. This functionality facilitates the reception of Web pages broadcast via mediums including satellite or cable.

2) Kernal 2—Data Stream modification 56—for data streams received by the MWS from external sources, the MWS prior to passing the data stream on to the standard browser could modify the data stream in a number of ways. Those modifications are not exclusive to but could include adding advertisements into the stream, adding a set of consistent buttons to all or a pre-specified number of HTML pages, and/or adding JAVA apps (e.g. smart printing, site viewers, smart site searching), 2)

3) Kernal 3—Site/Page Background Fetch 58—a users perception of network speed can be enhanced by analyzing the page a user is currently accessing and prefetching links associated with that page in the background. This prefetching can be preempted at any time by a user request to fetch a specific page.

4) Kernal 4—Compression 60—whenever a datastream is received from media other than a web server (e.g. local hard drive, CD-Rom, DVD) that datastream may be compressed. The MWS could perform any necessary decompression of the datastream as the datastream is being received.

5) Kernal 5—Security 62—where access by a client to only specific data sources or types would be allowed. The first operation performed by the MWS when trying to fetch a page requested by the browser is check if the user is allowed to access the page. A user can pre-store in the MWS a password protected list of pages and sites that are allowed to be viewed or alternatively a list of pages and sites that are not allowed to be viewed. This could also be a list of allowable sites accessible to a user after payment of a site fee for those sites which have a viewing payment associated with them. When a page is requested by the browser 2 it is first checked against the list. If the page is not deemed viewable a page describing that situation is sent to the browser. The MWS could additionally keep a list of all the pages requested for later review and monitoring.

6) Kernal 6—Translation 64—one or more automatic translators could be incorporated into the MWS so that web pages could be translated as they are obtained from the web. Depending on the speed of the translation engine, the translation could either be done on the fly, or when the page is cached on the local disk.

Each of the aforementioned enhancements provided by the MWS will be described in greater detail in the illustrations described herein.

Referring to FIG. 4, a flowchart illustrates a preferred operation of the MWS depicting the operations performed for a data stream arriving to a user from some external source. At step 73 the MWS receives an incoming data stream. At step 74, the MWS first analyzes the incoming data stream to determine whether the data stream is compressed. If so, the operation continues at step 76 where the incoming data stream is decompressed utilizing an appropriate decompression algorithm which is stored internally in the MWS. In an illustrative embodiment a plurality of decompression algorithms would be pre-stored in the MWS. If the incoming data stream is not compressed operation continues at decision step 78 where a determination is made as to whether the incoming data stream is in HTML format. If so, operation continues at step 82, otherwise, a translation would occur as depicted at step 80. The MWS would typically incorporate translators for a number of standard screen and terminal protocols including 3270, 5250, and VT100.

If the incoming data stream is already in HTML format operation continues at step 82 where a determination is made as to whether there is any secondary HTML source code. The additional code to be added to the primary incoming datastream could comprise additional HTML commands, Java source code, or Java Script source code. This secondary stream of sourcecode to be merged could be stored in the servers file system, or on a DVD, or as an additional page fetched from the server. The secondary code could enhance the primary datastream in a number of ways including: advertisements, standard buttons such as "update page", "Update site", "Connect to Page", or possibly a site map or a smart print button. The MWS could contain a ruleset for determining when to insert or not insert a secondary codestream. In an illustrative embodiment the ruleset could decide to always add the secondary stream, or it could otherwise decide to only add the secondary codestream for certain URL's. The ruleset is not limited to these alternatives, it could feasibly choose any user specified ruleset.

If secondary source code needs to be added to the primary datastream operation continues at step 84 where the primary data stream is amended, otherwise operation continues at step 86 where the data stream is then passed on to the resident Browser for further processing.

Having established that the requested data is not resident on any of the local storage mediums the webpage must then be downloaded from a remote server. In addition to this process, the MWS would perform a "pre-fetch" operation in a background (transparent) mode 81. The pre-fetch operation requires that the MWS download the data associated with each hypertext link whose URL matches the URL of the explicit user website request. The downloaded information would be cached locally in anticipation of a potential client request at some future point in the current internet session. The "pre-fetch" algorithm effectively streamlines the client/server session by making information instantly available if and when requested by the client. The algorithm eliminates the "downtime" associated with file transfer across the internet.

The "pre-fetch" process is considered to be user-transparent in that the process occurs independent of any explicit user initiated requests.

The "pre-fetch" algorithm restricts downloaded information to include those links associated with the currently accessed website. Associated is defined by the URL's having the same host address where the home address is located in the URL between the first set of double forward slashes and the next single forward slash (/). The home address refers to the specific host computer where the requested data resides. The remaining portion of the address details the path (directory) on the computer to the specific resource desired. Any non-associated hypertext links would be ignored by the pre-fetch algorithm. In those situations where downloading the total information content associated with a particular website would prove impractical given the memory limitations of most computers the information downloaded to the user would be restricted only to the extent that sufficient space is available on the local storage medium. Some user defined upper bound may be established beforehand.

As previously stated, the "prefetch routine" of the MWS described above restricts its selection of links to only those hypertext links containing associated pages. This restriction could be modified, however, to download data defined by non-associated links based on some pre-established criteria (e.g. statistical test, most recently used algorithm). For example, in one illustrative embodiment, the selection algorithm could employ a statistical test to decide which hypertext links to select or reject. The statistical test would access some previously defined usage table built into the MWS to decide the historical frequency of access of particular links and select only those links which exceed some user defined threshold.

Another test, for example, might select hypertext links based solely on those links most recently accessed. Where "most recent" would also be user definable. Other tests may be constructed on the basis of user preference or any other user defined criteria.

Figure 5B:
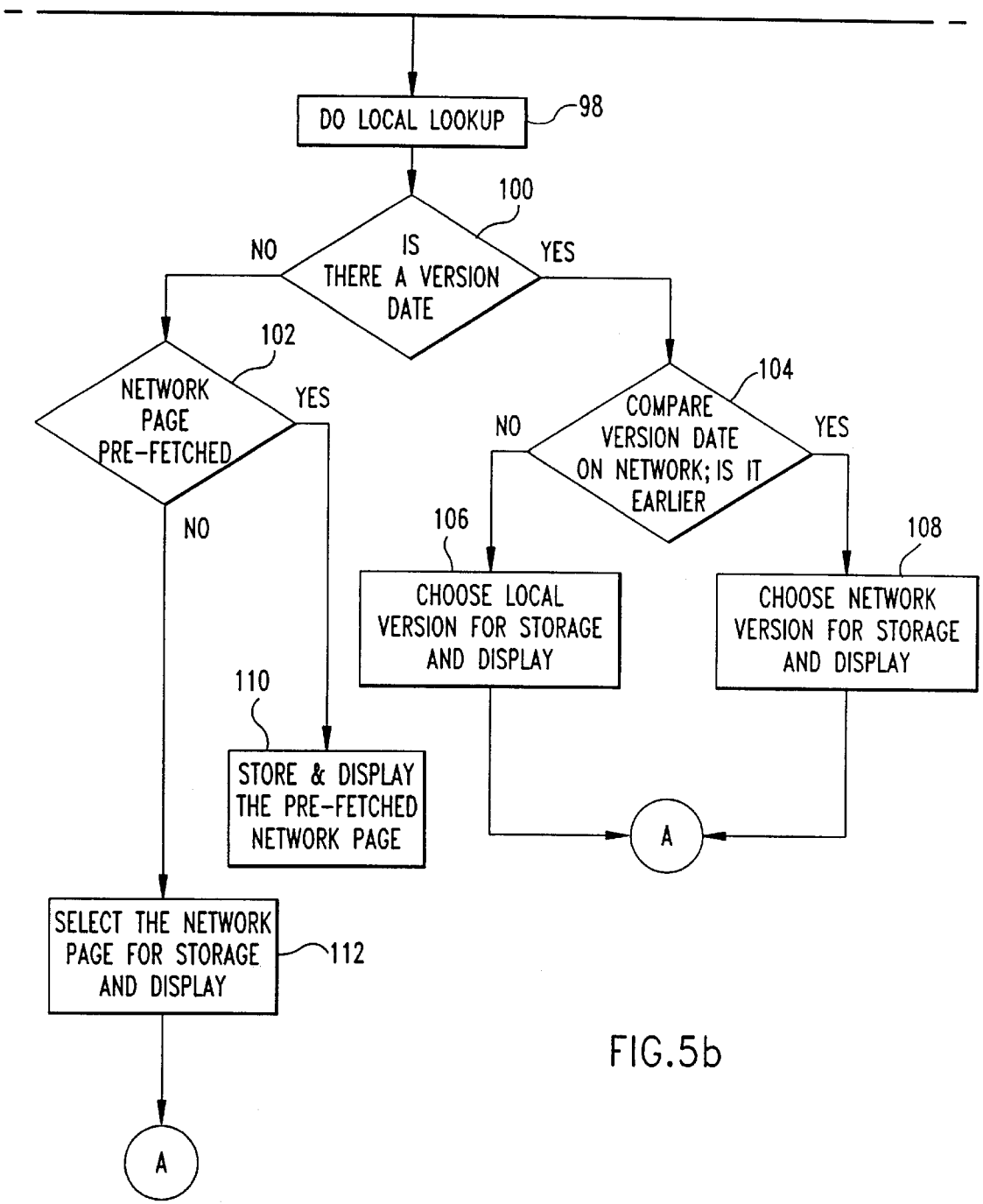
FIG. 5. is a flowchart of a preferred embodiment for processing outgoing information from a user, via a microweb server, MWS, to one of a multiplicity of sources.
Figure 5C:
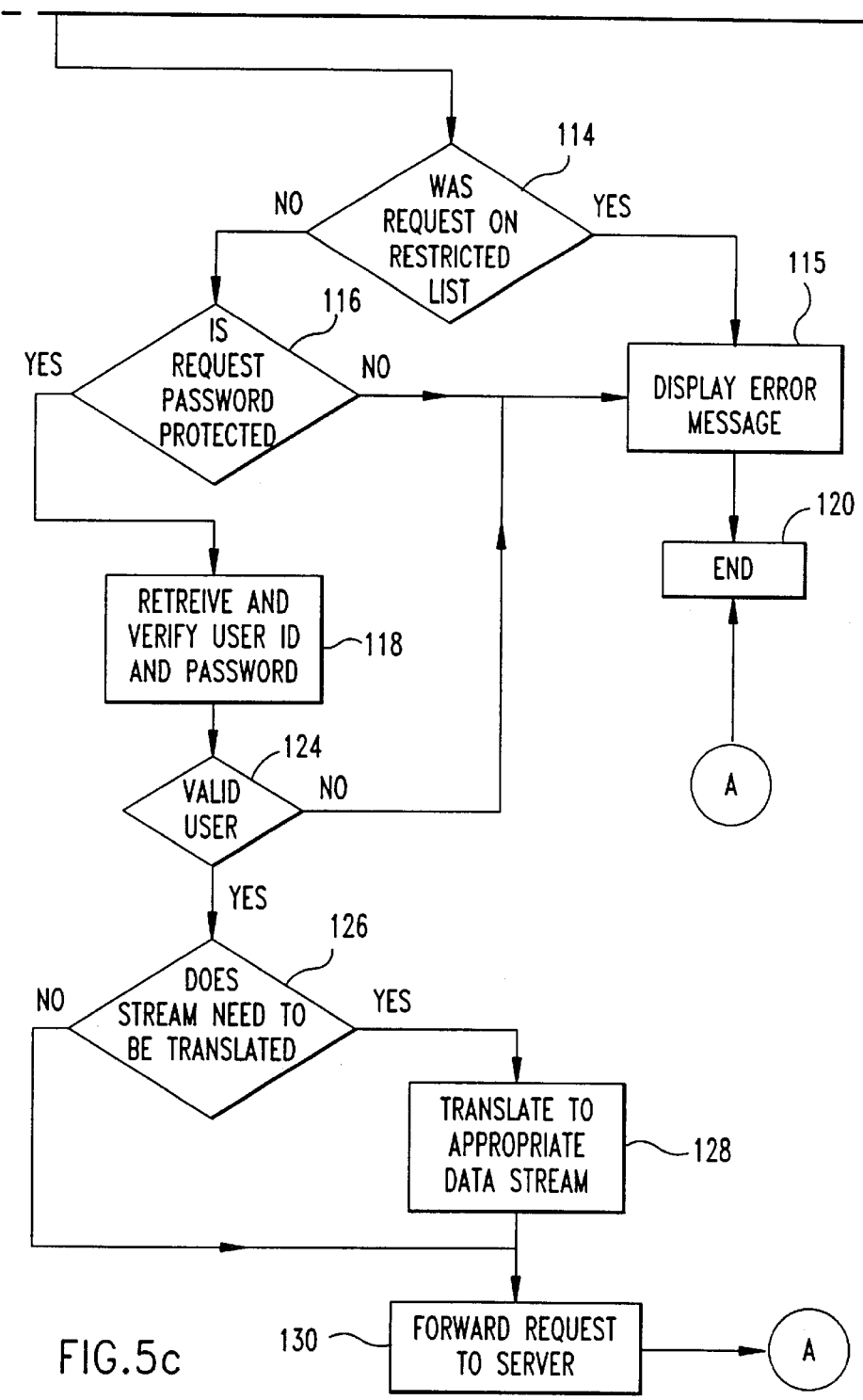

Referring to FIG. 5, a flowchart illustrates the operational steps performed by the MWS for outgoing data. The flowchart of FIG. 5 shows the process by which user requests are routed to some external server in accordance with the method of the present invention. A client computer typically initiates a request for information from one of a plurality of servers on the World Wide Web.

A request is issued by a client via a standard browser at step 88. At step 90 the request is first routed to the MWS. Once the request is received by the MWS the process continues to step 92 where a determination is made as to whether the URL request contains a request for an MWS function. That is, for any functionality that may have been incorporated into the standard web browser by the MWS, this step checks whether the user attempted to exercise the MWS supplied functionality. For example, the MWS may have inserted a print button, the MWS has to be able to act on a print request when issued by a client. The MWS could be embedded as part of the returned URL address, and then stripped off for execution at step 94. Otherwise operation continues at decision step 96, where a determination is made as to whether a local (cached) copy of the requested data exists on one of the local storage mediums (hard-drive, CD-Rom, DVD) by searching an internal URL lookup table. If a local copy exists the MWS must first do a local copy lookup using the parameters of the internal URL lookup table at step 98. The operation continues at decision step 100 where a determination is made as to whether the network (downloaded) version contains a version date. If so, the operation continues at step 104 where the MWS compares the version date of the local copy with the network copy to decide whether the network version date is earlier. If so, operation continues at step 108 where the network version is selected for both storage and display. Otherwise, the local version is selected at step 106, for storage and display. If there is no version date associated with the local lookup the process continues at decision step 102 where a determination is made as to whether the network page has been "pre-fetched". If so, operation continues at step 110 where the pre-fetched network page is stored and displayed. Otherwise operation continues at step 112 where the MWS will select the network page for storage and display. The process then terminates at step 120. The only situation that involves displaying the local copy is one where the user is not currently connected to the network.

In the situation where no local copy exists, operation continues at decision step 114 where the MWS will perform a user authorization check. The webpage requested will be checked against a table, internal to the MWS, consisting of restricted, non-authorized webpages for that user. If the current user request is contained on this list the MWS will return a message to the user indicating that the webpage is not authorized for viewing for that particular user at step 115. Process then terminates at step 120. Otherwise, the requested webpage is considered authorized and therefore viewable by the user. In the event that the request is considered authorized operation continues at decision step 116 where a determination is made as to whether the requested page is password protected. If so, operation continues at step 118 where the user's ID and password are then checked by the MWS against an internal table to establish the identity of the client. At step 124 a determination is made as to the validity of the user's ID and password. If the user supplied ID and password prove invalid operation continues at step 122 where an error message is displayed. The process then terminates at step 120. Otherwise, given that the user has supplied a valid ID and password operation continues at step 126 where a determination is made as to whether the outgoing datastream requires a translation. The translation is required in those instances where the protocol of the incoming datastream was something other than HTML. If a translation is not required operation continues at step 130 where the request is forwarded to the server to be fulfilled. Otherwise an appropriate translation will be performed at step 128 on the outgoing datastream. After any required translations are performed operation continues at step 130 where the request is forwarded to the remote server. The process then terminates at step 120.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what we claim as new, and desire to secure by Letters Patent is:

1. A micro web server for supporting an HTML web browser and providing HTML formatted content thereto from a variety of data resources as requested by a user, said micro web server running in a layer between said browser and an operating system for a personal computer said micro web server comprising:
   a) a search engine for:
      (i) receiving data requests comprising web pages with associated URL addresses from said HTML web browser;
      (ii) locating data from said variety of data resources requested by said HTML browser;
      (iii) retrieving data requested by said HTML browser from said variety of data resources;
      (iv) receiving data broadcast from said variety of data resources;
   (b) a first kernal for translating said retrieved data to HTML format when HTML formatting is not found;
   (c) a second kernal for performing a decompression on retrieved data when said data is compressed;
   (d) a third kernal for providing selective access to specific web pages or portions of specific web pages as determined by a user defined access table;
   (e) a fourth kernal for translating one of a plurality of internet protocols to HTTP protocol if HTTP protocol is not found;
   (f) a fifth kernal for transparently retrieving web pages whose URL addresses match URL addresses associated with said data requests from the HTML web browser for making the web pages instantly available to the HTML browser; and
   (g) a sixth kernal for amending said data requested and broadcast from said variety of resources with other data;
   wherein the micro web server transmits requested data to the HTML browser in a form suitable for display by the HTML browser according to functions performed by one or more of the first through the sixth kernals in response to the data requests.

2. A micro web server according to claim 1, wherein said data resources include at least one local data storage device and at least one remote server.

3. A micro web server for supporting an HTML web browser as claimed in claim 2, wherein said local data storage device includes one of a hard disk, a DVD, or a CD-Rom.

4. A micro web server for supporting an HTML web browser as claimed in claim 2, further comprising means for utilizing a local version of said requested data on said local storage device when one exists.

5. A micro web server for supporting an HTML web browser as claimed in claim 4, where the means for utilizing a local version of said requested data when one exists on said local storage device includes:
   (i) accessing a lookup table internal to said micro web server local storage device to determine if a local version exists;

(ii) if a local version exists determining whether there is an associated version date; and (iii) if there is an associated version date comparing the associated version date with the version date associated with a downloaded web page from said remote server.

6. A micro web server for supporting an HTML web browser as claimed in claim 4, wherein said web page associated with the more current version date is stored and displayed.

7. A micro web server for supporting an HTML web browser as claimed in claim 1, wherein said user defined access table contained in said third kernal comprises a list of unauthorized URL web pages.

8. A micro web server for supporting an HTML web browser as claimed in claim 1, wherein said third kernal denies said user request when said request is made for one of said unauthorized URL web pages.

9. A micro web server for supporting an HTML web browser as claimed in claim 1, wherein said user defined access table contained in said third kernal comprises a list of authorized URL web pages.

10. A micro web server for supporting an HTML web browser as claimed in claim 1, wherein said third kernal executes said user request when said request is made for one of said authorized URL web pages.

11. A micro web server for supporting an HTML web browser as claimed in claim 1, wherein said fifth kernal further comprises an algorithm for determining which URL locations on a downloaded webpage will be searched by said search engine.

12. A micro web server for supporting an HTML web browser as claimed in claim 1, wherein said second kernal further comprises one or more algorithms for decompressing HTML data associated with a web page from a remote server.

13. A micro web server for supporting an HTML web browser as claimed in claim 12, wherein said algorithms include statistical tests or a most recently accessed test.

14. A micro web server for supporting an HTML web browser as claimed in claim 1, wherein said sixth kernal amends said data requested and broadcast from said variety of resources with secondary HTML sourcecode comprising HTML commands, JAVA sourcecode.

15. A method for supporting an HTML web browser and providing HTML formatted content thereto from a variety of data resources as requested by a user, said micro web server running, in a layer between said browser and an operating system for a personal computer, the method comprising the steps of:

(a) receiving data requests comprising web pages with associated URL addresses from said HTML web browser;

(b) locating data from said variety of data resources requested by said HTML browser;

(c) retrieving data requested by said HTML browser from said variety of data resources;

(d) receiving data broadcast from said variety of data resources;

(e) translating said retrieved data to HTML format when HTML formatting is not found;

(f) performing a decompression on retrieved data when said data is compressed;

(g) providing selective access to specific web pages or portions of specific web pages as determined by a user defined access table;

(h) translating one of a plurality of internet protocols to the HTTP protocol if HTTP protocol is not found;

(i) transparently retrieving web pages whose URL addresses match URL addresses associated with said data requests from the HTML, web browser for making the web pages instantly available to the HTML web browser; and (j) amending said data requested and broadcast from said variety of resources with other data;

wherein the micro web server transmits requested data to the HTML browser in a form suitable for display by the HTML browser according to functions performed by one or more of the first through the sixth kernals in response to the data requests.

16. The method according to claim 15, wherein said data resources include at least one local data storage device and at least one remote server.

17. The method according to claim 16, wherein said local data storage device includes one of a hard disk, a DVD, or a CD-Rom.

18. The method according to claim 16, further comprising means for utilizing a local version of said requested data on said local storage device when one exists.

19. The method according to claim 18, where the means for utilizing a local version of said requested data when one exists on said local storage device includes:

(i) accessing a lookup table internal to said micro web server local storage device to determine if a local version exists;

(ii) if a local version exists determining whether there is an associated version date; and (iii) if there is an associated version date comparing the associated version date with the version date associated with a downloaded web page from said remote server.

20. The method according to claim 18, wherein said web page associated with the more current version date is stored and displayed.

21. The method according to claim 15, wherein said user defined access comprises a list of unauthorized URL web pages.

22. The method according to claim 15, said user request is denied when said request is made for one of said unauthorized URL web pages.

23. The method according to claim 15, wherein said user defined access table comprises a list of authorized URL web pages.

24. The method according to claim 15, wherein said user request is executed when said request is made for one of said authorized URL web pages.

25. The method according to claim 15, wherein the transparently receiving step further comprises an algorithm for determining which URL locations on a downloaded webpage will be searched by said search engine.

26. The method according to claim 15, wherein said decompression step further comprises one or more algorithms for decompressing HTML data associated with a web page from a remote server.

27. The method according to claim 26, wherein said algorithms include statistical tests or a most recently accessed test.

28. The method according to claim 15, wherein the step of amending said data requested and broadcast from said variety of resources further comprises amending said data with secondary HTML sourcecode comprising HTML commands, JAVA sourcecode.

29. A computer program device readable by a machine, tangibly embodying a program of instructions executable by the machine to perform method steps for supporting an HTML web browser and providing HTML formatted content thereto from a variety of data resources as requested by a user, said program of instructions running in a layer between said browser and an operating system for a personal computer, the method comprising the steps of:

(a) receiving data requests comprising web pages with associated URL addresses from said HTML web browser;

(b) locating data from said variety of data resources requested by said HTML browser;

(c) retrieving data requested by said HTML browser from said variety of data resources;

(d) receiving data broadcast from said variety of data resources;

(e) translating said retrieved data to HTML, format when HTML formatting is not found;

(f) performing a decompression on retrieved data when said data is compressed;

(g) providing selective access to specific web pages or portions of specific web pages as determined by a user defined access table;

(h) translating one of a plurality of internet protocols to the HTTP protocol if HTTP protocol is not found;

(i) transparently retrieving web pages whose URL addresses match URL addresses associated with said data requests from the HTML web browser for making the web pages instantly available to the HTML web browser; and (j) amending said data requested and broadcast from said variety of resources with other data;

wherein the micro web server transmits requested data to the HTML browser in a form suitable for display by the HTML browser according to functions performed by one or more of the first through the sixth kernals in response to the data requests.

30. The computer program device according to claim 29, wherein said data resources include at least one local data storage device and at least one remote server.

31. The computer program device according to claim 30, wherein said local data storage device includes one of a hard disk, a DVD, or a CD-Rom.

32. The computer program device according to claim 30, further comprising means for utilizing a local version of said requested data on said local storage device when one exists.

33. The computer program device according to claim 32, where the means for utilizing a local version of said requested data when one exists on said local storage device includes:

(i) accessing a lookup table internal to said micro web server local storage device to determine if a local version exists;

(ii) if a local version exists determining whether there is an associated version date; and (iii) if there is an associated version date comparing the associated version date with the version date associated with a downloaded web page from said remote server.

34. The computer program device according to claim 32, wherein said web page associated with the more current version date is stored and displayed.

35. The computer program device according to claim 29, wherein said user defined access comprises a list of unauthorized URL web pages.

36. The computer program device according to claim 29, said user request is denied when said request is made for one of said unauthorized URL web pages.

37. The computer program device according to claim 29, wherein said user defined access table comprises a list of authorized URL web pages.

38. The computer program device according to claim 29, wherein said user request is executed when said request is made for one of said authorized URL web pages.

39. The computer program device according to claim 29, wherein the transparently receiving step further comprises an algorithm for determining which URL locations on a downloaded webpage will be searched by said search engine.

40. The computer program device according to claim 29, wherein said decompression step further comprises one or more algorithms for decompressing HTML data associated with a web page from a remote server.

41. The computer program device according to claim 40, wherein said algorithms include statistical tests or a most recently accessed test.

42. The computer program device according to claim 29, wherein the step of amending said data requested and broadcast from said variety of resources further comprises amending said data with secondary HTML sourcecode comprising HTML commands, JAVA sourcecode.

* * * * *